Nov. 9, 1954 T. S. FITCHETT ET AL 2,693,755

DIVIDED DUCTOR ROLL

Filed Sept. 15, 1949 10 Sheets-Sheet 1

Inventors

T. S. Fitchett and
Leonard Rockstrom.

By Thomas W. Y. Clark

Attorney

DIVIDED DUCTOR ROLL

Filed Sept. 15, 1949

Inventors
T. S. Fitchett and
Leonard Rockstrom
By Thomas W. Y. Clark
Attorney

Inventors
T. S. Fitchett and
Leonard Rockstrom
By Thomas W. Y. Clark
Attorney

DIVIDED DUCTOR ROLL

Filed Sept. 15, 1949 10 Sheets-Sheet 4

Inventors
T. S. Fitchett and
Leonard Rockstrom
By Thomas W. Y. Clark
Attorney

Nov. 9, 1954 T. S. FITCHETT ET AL 2,693,755

DIVIDED DUCTOR ROLL

Filed Sept. 15, 1949 10 Sheets-Sheet 5

Inventors
T. S. Fitchett and
Leonard Rockstrom.
By Thomas W. Y. Clark
Attorney

Nov. 9, 1954 T. S. FITCHETT ET AL 2,693,755

DIVIDED DUCTOR ROLL

Filed Sept. 15, 1949 10 Sheets-Sheet 6

Inventors
T. S. Fitchett and
Leonard Rockstrom
By Thomas W. Y. Clark
Attorney

Nov. 9, 1954 T. S. FITCHETT ET AL 2,693,755

DIVIDED DUCTOR ROLL

Filed Sept. 15, 1949 10 Sheets-Sheet 7

Inventors

T. S. Fitchett and
Leonard Rockstrom

By Thomas W. Y. Clark

Attorney

DIVIDED DUCTOR ROLL

Filed Sept. 15, 1949 10 Sheets-Sheet 8

Inventors
T. S. Fitchett and
Leonard Rockstrom
By Thomas W. Y. Clark
Attorney

Nov. 9, 1954 T. S. FITCHETT ET AL 2,693,755

DIVIDED DUCTOR ROLL

Filed Sept. 15, 1949 10 Sheets-Sheet 9

Inventors
T. S. Fitchett and
Leonard Rockstrom
By Thomas W. Y. Clark
Attorney

Nov. 9, 1954

T. S. FITCHETT ET AL 2,693,755

DIVIDED DUCTOR ROLL

Filed Sept. 15, 1949

10 Sheets-Sheet 10

Inventors
T. S. Fitchett and
Leonard Rockstrom
By [signature]
Attorney 2,693,755
Patented Nov. 9, 1954

2,693,755

DIVIDED DUCTOR ROLL

Thomas Somerset Fitchett and Leonard Rockstrom, Baltimore, Md., assignors to F. X. Hooper Company, Inc., a corporation of Maryland Application September 15, 1949, Serial No. 115,818

19 Claims. (Cl. 101—350)

This invention relates to an improvement in the ductor rollers of the inking mechanism of a rotary press.

The ductor roller is used to transfer ink from a very slowly rotating ink fountain roller to a very fast rotating ink feed roller which may be the vibrating roller. The ink feed roller or vibrating roller travels at the same surface speed as the impression cylinder of the press and on the large presses of today these speeds are around one thousand feet per minute and with the wider sheet being printed, the rollers have gradually become longer and necessarily heavier to prevent their bending and the consequent uneven distribution of ink. The single ductor roll of the present day machine has consequently become so heavy that when it oscillates between the substantially stationary ink fountain roller and the rapidly rotating ink transfer or vibrating roller, great accelerating and stopping forces are required to bring it from substantially a stop to a rapid surface speed and then back to a stop with each oscillation. These forces break down the comparatively soft surface of the ductor roller and require its frequent replacement. They also cause severe deflections of the ductor roller, the vibrator roller and the fountain roller, setting up objectionable vibrations and impairing ink distribution.

An object of this invention is to reduce the injury to the ductor roller to a minimum and also to substantially reduce deflections and vibartions of the ink fountain roller and the ink feed roller. This object is obtained by dividing the ductor roller into a series of rollers having all axes parallel and each ductor roller covering a portion of the length of the ink fountain roller and of the ink feed roller. The ductor rollers thus made may be substantially smaller in diameter than a single ductor roller and yet present greater rigidity of surface to its respective contacting rollers and obtain substantially greater evenness of distribution of ink on the rollers.

In the preferred form of the invention two ductor rollers are utilized each covering substantially one-half the length of the ink fountain roller and the ink feed roller although a greater number of divisions of the length of the ductor roller could be made if desired. The film of ink delivered by the divided ductor rollers will be more even than if a heavy single ductor roller were used.

Where two ductor rollers are used of one half the length of the single ductor roller and, for example, one half the diameter of the single roller, the mass of each small roller will be one eighth that of the larger roller. The forces required to accelerate each small roller will, therefore, be one sixteenth that of the forces needed to stop and start the larger roller since these forces are proportioned to the mass of the roller multiplied by the square of its diameter and by its angular acceleration. The life expectancy of each smaller roller would, therefore, be equal to eight times that of the single larger roller since this life would be proportioned to the accelerating forces multiplied by the number of revolutions of the rollers in question during a given time interval.

The deflections of each of the half length, half diameter rollers which are caused by the accelerating forces will be equal to one eighth that of the single large roller since these deflections are inversely proportioned to the fourth power of the diameters, directly proportional to the third power of the lengths and directly proportional to the forces causing deflection. This increase in rigidity is based on the assumption of a perfectly rigid center of machine mounting for each of the half length rollers.

This rigidity is not quite possible to attain, but for all practical purposes it may be approached quite closely, resulting in at least a seven to one increase in rigidity of the ductor rollers.

The deflections of the fountain roller and the vibrator roller will be proportional to the sum of the accelerating forces, or equal to one eighth that of the same rollers used in conjunction with the single large ductor roller.

The above and other objects and advantages of the invention will be apparent from the following description and the accompanying drawings forming a part hereof, and in which.

In the drawings similar numerals refer to similar parts throughout the several views.

Figure 1:
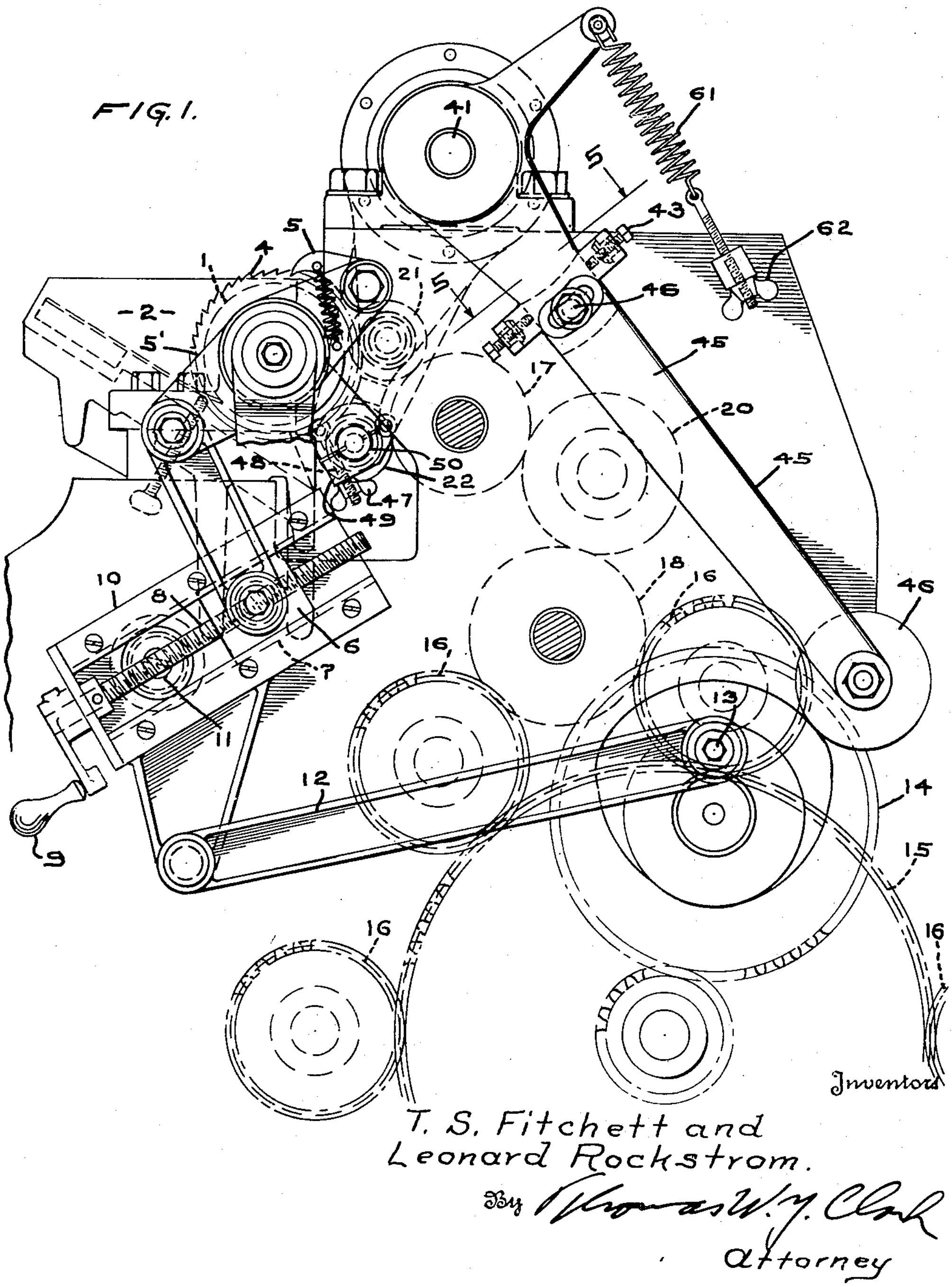
Figure 1 is a side elevational view of an inking mechanism employing the preferred modification of the divided ductor rollers.

The fountain roller 1 operates in a fountain 2 above a drip pan 3. It is driven by a ratchet 4 operated by a pawl 5 on a lever arm 5' which pivots about the axes of the roller. Arm 5' is oscillated by a link which is pivoted on block 6 longitudinally slidable in grooves 7 by means of screw 8 and handle 9. The grooves or guides 7 are within the rocking member 10 pivoted at 11 in the machine and it is rocked by link 12 pivoted at 13 to one side of driven gear 14. The impression or plate cylinder or roller 15 is surrounded by the ink distributing or form rollers 16. The vibrating rollers 17 and 18 are vibrated longitudinally by mechanism old in the art, roller 18 transferring the ink to its adjacent form rollers 16. Distributing roller 20 is between the two longitudinally vibrating rollers 17 and 18.

Longitudinally vibrating roller 17, which may be called an ink feed roller, takes ink from the ductor rollers 21 and 22. These rollers are oscillated between the ink fountain roller 1 in the ink feed roller 17. Rollers 21 and 22 are preferably relatively soft composition rollers, the composition being mounted on the tubular inner core 23 of each roller. Each of these rollers 21 and 22 is mounted in a pair of separately oscillating arms 24, 25 and 26, 27. These arms are in turn oscillated back and forth, one by means of and the other upon large supporting cylinder 28 mounted in bearings 29 in the sides of the inking mechanism.

Figures 2, 3:
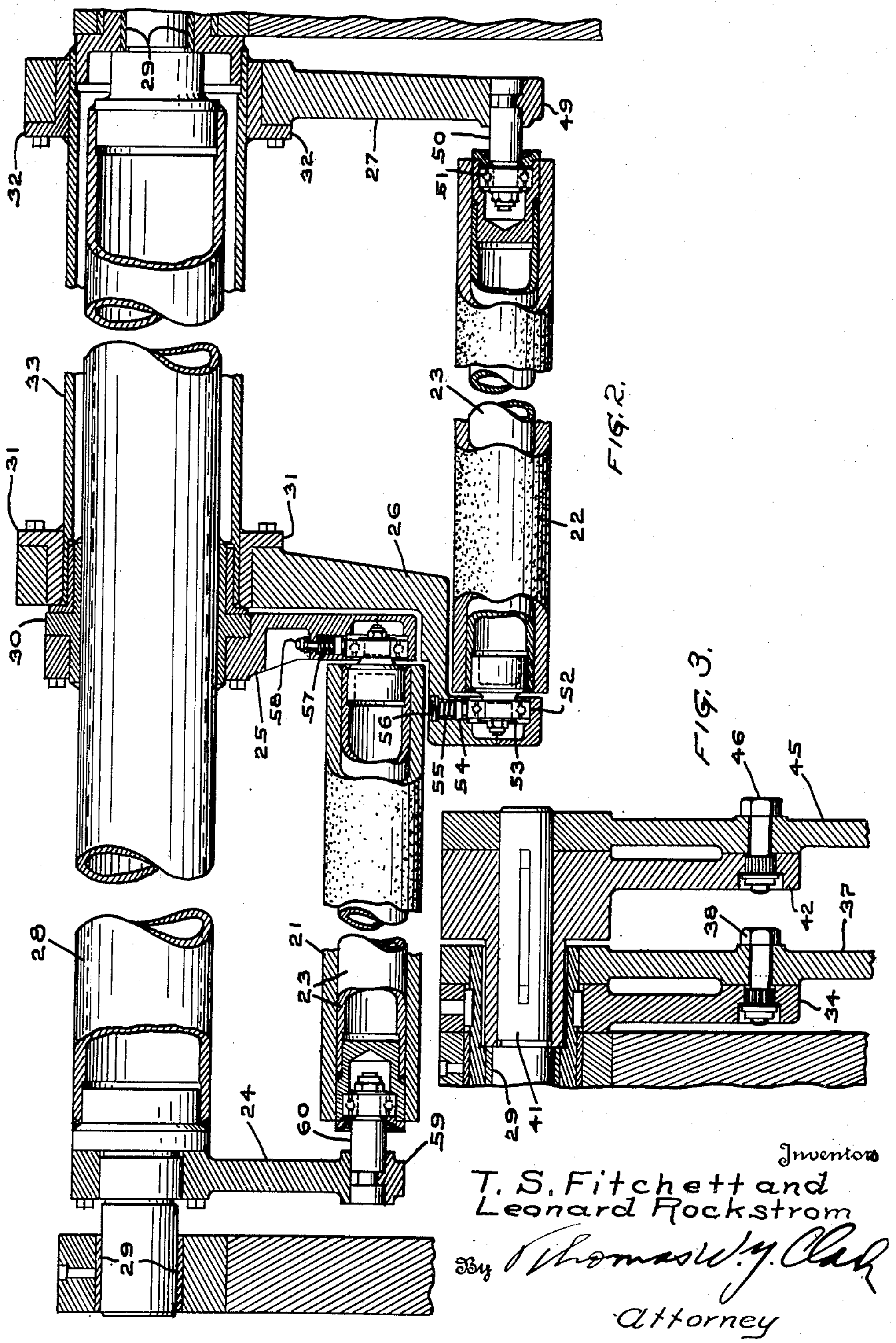
Figure 2 is a transverse sectional view of the mechanism showing the divided ductor rollers of the preferred form.
Figure 3 is a sectional view of the oscillating means for the ductor rollers, continuing Figure 2 to the right.
Figures 4, 9:
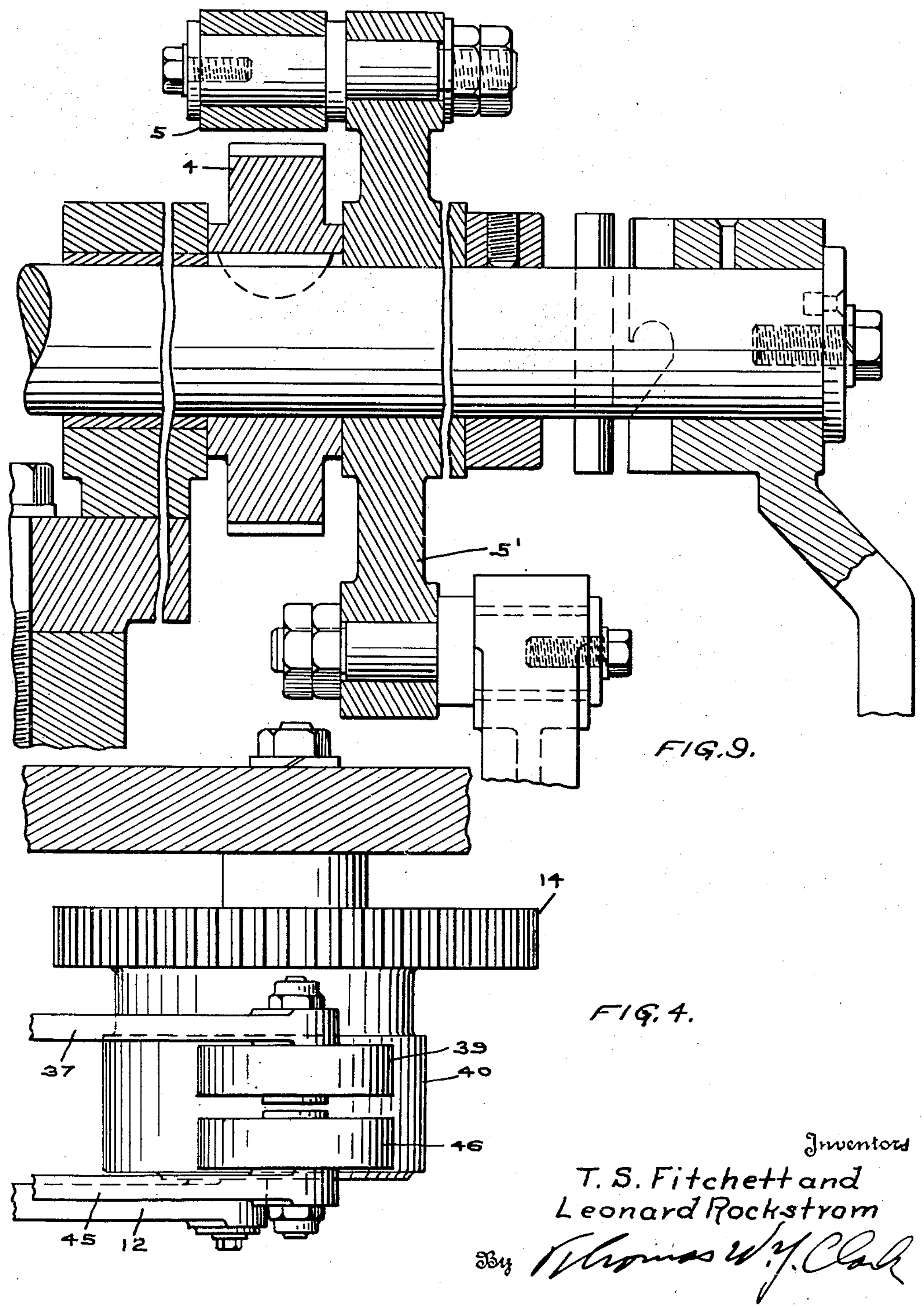
Figure 4 is a fragmentary top plan view of the oscillating cam and followers.
Figure 9 is a transverse sectional view of the ink fountain roller drive.
Figure 15:
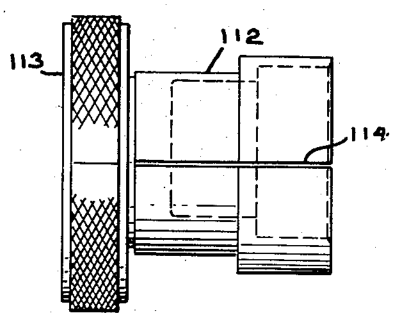
Figure 15 is an elevational view of the bearing eccentric.
Figure 5:
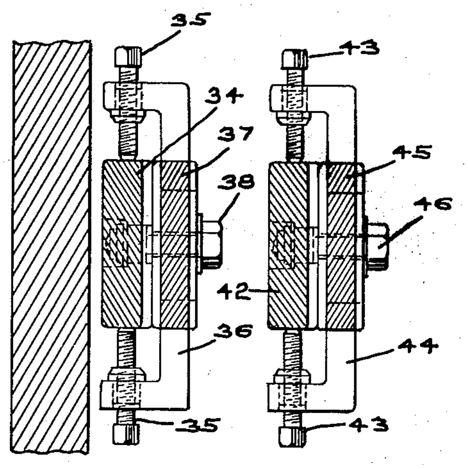
Figure 5 is a cross sectional view on line 5—5 of Figure 1.
Figure 17:
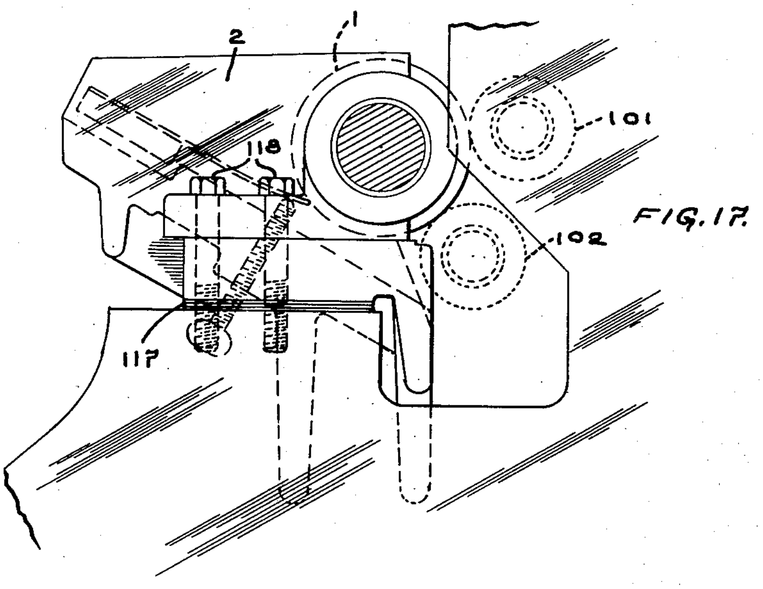
Figure 17 is a side elevational view of the means for adjusting the fountain roller position in the second modification.
Figure 6:
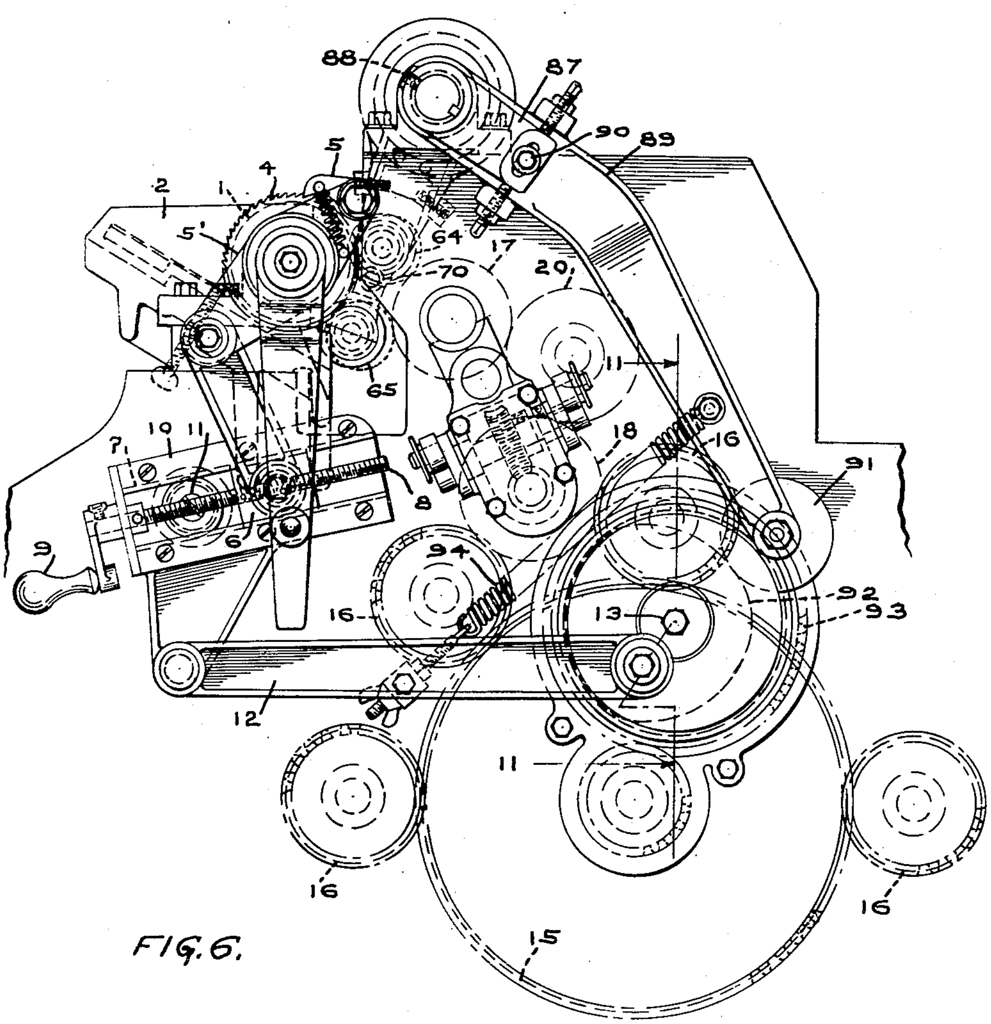
Figure 6 is a side elevational view of an inking mechanism with a modified form of divided ductor rollers.
Figure 7:
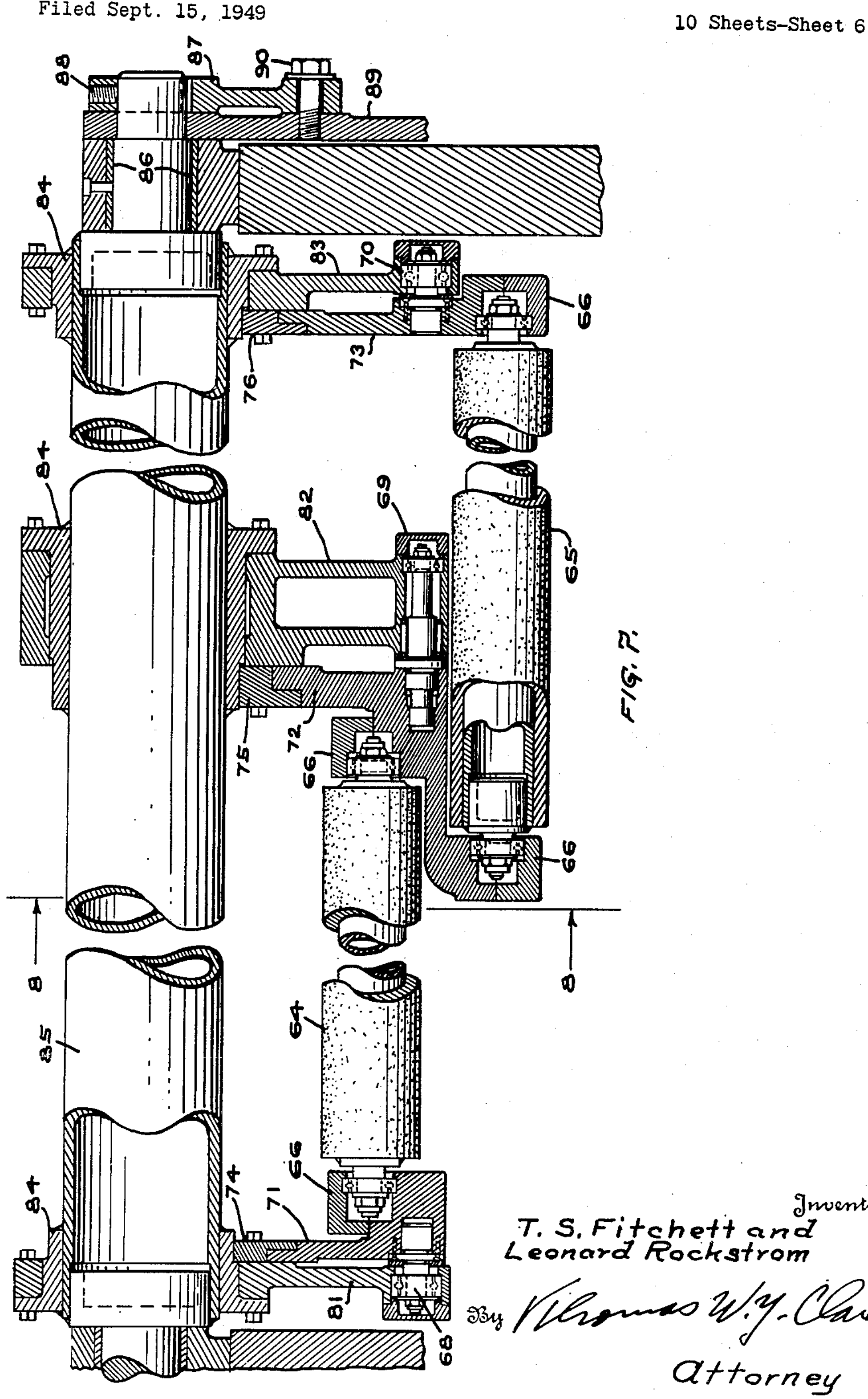
Figure 7 is a longitudinal sectional view of this form of divided ductor roller.

From Figure 2 it will be apparent that this large cylinder 28 has arms 24 and 25 made fast thereto by screws, arm 25 being affixed to the collar 30 welded to the cylinder 28. Arms 26 and 27 are similarly screwed to collars 31 and 32 welded to cylinder 33 surrounding and pivoting upon cylinder 28 and its bearing 29 at one end. Cylinder 33, carrying rocking arms 26 and 27, has keyed thereto short arm 34 adjustable by means of screws 35 mounted in U-shaped bracket 36 on rocking arm 37 and held fast thereto by bolt 38, when adjusted. Rocking arm 37 is rocked by means of follower 39 riding on cam 40 integral with gear 14.

Arms 24 and 25 supporting roller 21 from cylinder 28 are likewise oscillated by oscillating the cylinder 28, one bearing of which has the extension therefrom shaft 41 which has keyed thereto short arm 42 adjusted by screws 43 in U-shaped bracket 44 forming a part of rocking arm 45 and to which the short arm 42 is affixed by bolt 46 when adjusted. Arm 45 likewise has a follower 46 at its rocking end, rocked by cam 40.

Roller 22 may be removed from its bearing by releasing the wingnut 47 from the U-shaped groove 48 in the front of the lower half 49 of the bearing axle holder. As shown in Figure 2 the lower half 49 of the bearing holder holds axle 50 in the arm 27 which axle fits into and holds fast the inner runway of the roller bearing 51. The outer runway 52 of the bearing 53 at the other end of the roller 22 is held by means of head 54 held down by spring 55 which in turn is held by screw 56 in the arm 26. Releasing of the bearing axle 50 permits the roller 22 to be pulled down slightly at its then free end and the whole roller bearing at the other end may then be released because of the spring 55 being compressed by that action. Roller 21 has a similar mounting but with a compression spring 57 being held on a bolt 58 and the spring releases the bearing after the release of the split socket 59 of the bearing axle 60. The arms 37 and 45 have their followers pulled into contact with the cam 40 by means of springs 61 held at the other end fixed to the machine by means of turnbuckles 62.

The two rollers 21 and 22 have their axes parallel to cylindrical member 28 and of course also parallel to fountain roller 1 and ink feed roller 17. As these rollers 21 and 22 are oscillated between the rollers 1 and 17 they take ink from the fountain roller and transfer it to the ink roller 17. From Figure 2 it will be apparent that they overlap very slightly at the center of their combined operation. The rollers 21 and 22 in making their respective contacts with rollers 1 and 17 may be independently adjusted on their rocking arms 37 and 45 by means of the screws 35 and 43 and fixed to their respective arms by bolts 38 and 46. The rollers 21 and 22 may be substantially one-half the diameter that would be required of a single ductor roller of corresponding length and rigidity for delivering ink from the ink fountain roller to the ink feed roller and such a reduction in diameter greatly reduces the inertia of the roller in its periodic contact first with the substantially stationary ink fountain roller and the very rapidly rotating ink feed roller rotating at a surface speed of several hundred feet per minute and thus the surface of these ductor rollers lasts much longer and the surfaces of the ink fountain roller and the ink feed roller are substantially unaffected.

A modification of the divided ductor roller is shown in Figures 6 to 11 inclusive, in which the ink fountain roller is operated by a mechanism similar to that of the preferred form. The ductor rollers 64 and 65 of this modification are mounted in roller bearings which are in turn mounted in split housings 66 which may be held together with screws 67. These bearing housings are all four mounted on an axis through the center of bearings 68, 69 and 70 and about these three bearings the two rollers may move at will, although their movement is greatly restrained by means of arms 71, 72 and 73 fitting back of guides 74, 75 and 76 and each guide 74, 75 and 76 has spring sockets 77 on each side in which fit springs 78 held by means of screws 79, the spring entering sockets 80 in arms 71, 72 and 73. These springs allow a measure of free play to the rollers 64 and 65 so that they always make substantially simultaneous line contact with the rollers 1 and 17.

Figure 8:
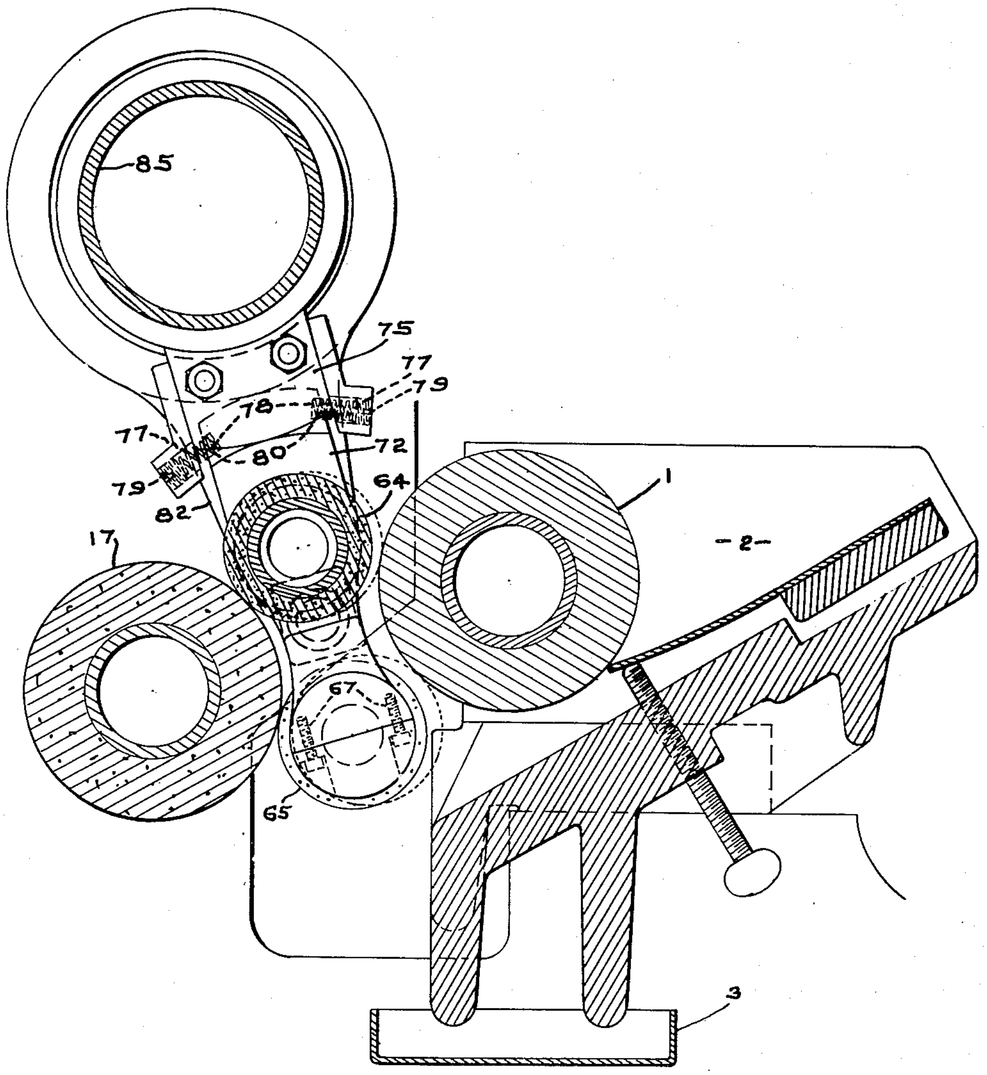
Figure 8 is a transverse sectional view showing this form of the divided ductor roller in operation, on line 8—8 of Figure 7.
Figures 10, 11:
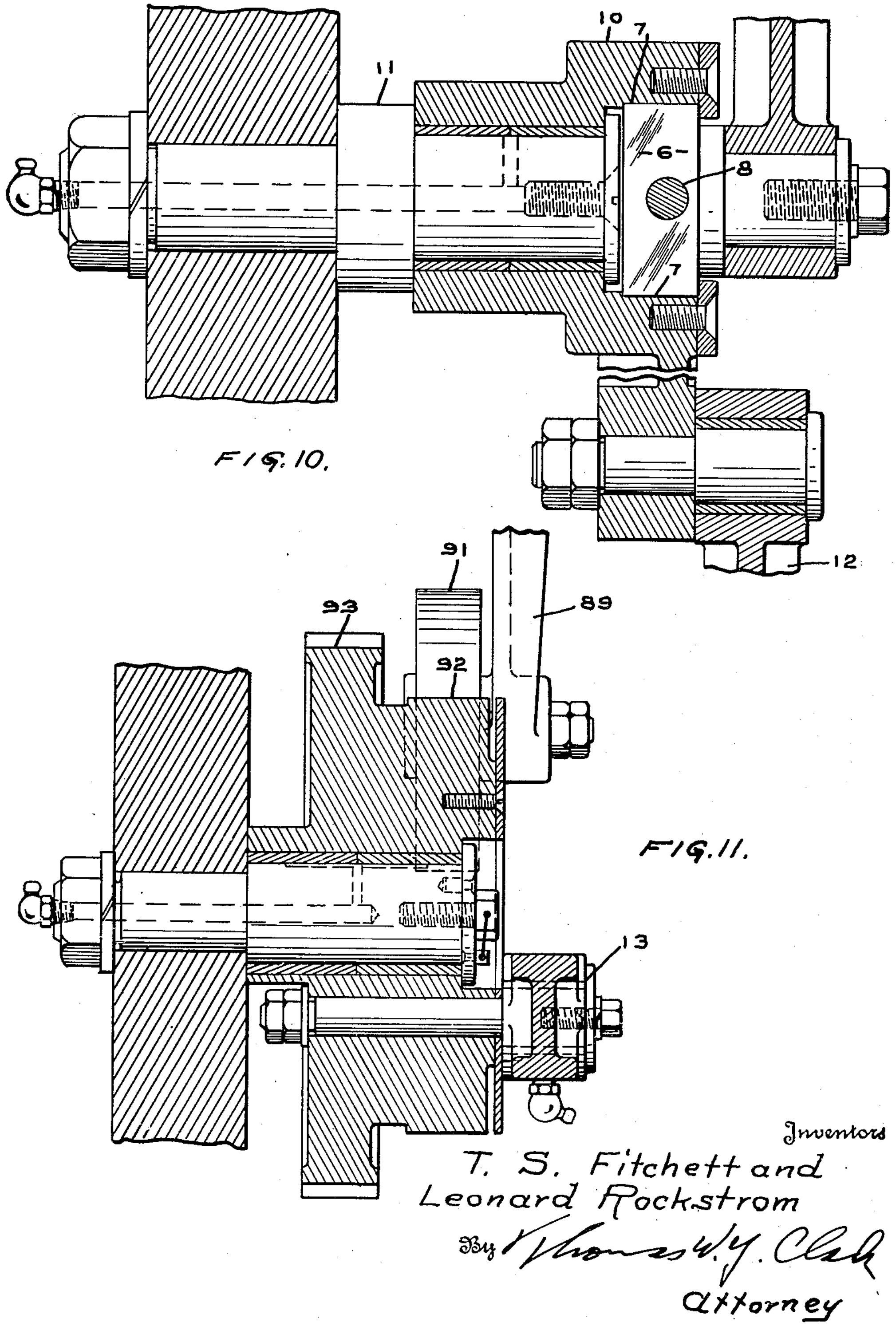
Figure 10 is a similar view of another portion of the ink fountain roller drive.
Figure 11 is a transverse sectional view of the ductor roller oscillating means, on line 11—11 of Figure 6.
Figure 12:
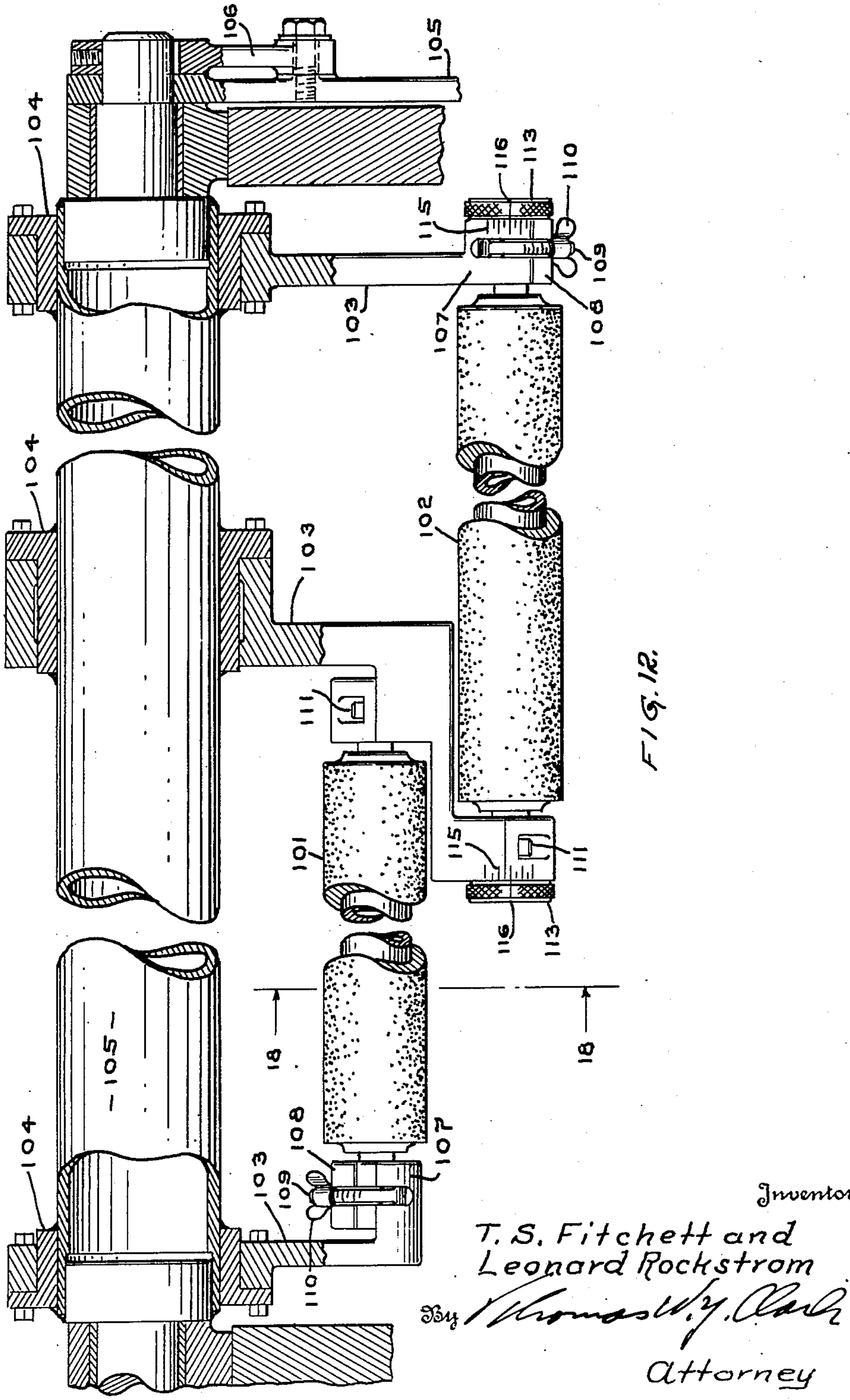
Figure 12 is a longitudinal view partly in section of a second modified form of a divided ductor roller.

In the modification shown in Figures 6 to 11 inclusive the axis of the bearings 68, 69 and 70 is preferably not exactly between the axes of the two rollers 64 and 65. It is rather slightly above the center of the axes of the two rollers, as shown in Figure 8 so that when the upper roller 64 contacts either roller 1 or 17, because of the short lever arm between the center of that roller and the center of pivot of the two rollers, the longer lever arm between the center of the pivot of the two rollers and the axis of the lower roller 65 will rapidly move the lower roller to contacting position with the respective roller 1 or 17. This unequal placing of the axis of rotation of the two rollers accelerates the contact of the lower roller and gives more even ink delivery to the ink feed roller.

The arms 81, 82 and 83 have at their upper ends rings bolted to collars 84 welded to the cylinder 85 which through its bearing 86 has attached thereto short arm 87 by means of set screw 88 which is in turn attached to rocking arm 89 through means of adjacent set screw 90 and the rocking arm 89 has at its lower end a follower 91 oscillated by cam 92 integral with gear 93. The rocking arm 89 has its follower 91 held in contact with its cam by means of spring 94.

A third form of the invention is shown in Figures 12 to 18 inclusive in which the two ductor rollers 101 and 102 are held in arms 103, the upper ends of which form rings which in turn surround and are bolted to rings 104 welded to cylinder 105 which may be rocked to oscillate the ductor rollers by an arm 105 adjustable in respect to an arm held fast to the cylinder 106 identical to the preceding modification. In the instant modification the outer ends of the rollers 101 and 102 are mounted in split bearings 107 having a removable or hinged section 108 held in proper position by hinged bolts 109 and wing nuts 110. The inner bearing housings are likewise split and may be removed by removing screws 111. Roller 102 has the outer runway of its roller bearing in an eccentric cage 112 which has an outer solid head 113 forming a knurled handle by means of which to turn the eccentric. The eccentric is split at four places as shown at 114 in Figures 13, 14 and 15 to allow for its compression after adjustment to firmly hold the outer runway of the bearing. The brackets of arms 103 holding roller 102 are graduated as shown at 115 and by means of the center line 116 on the eccentric heads, the accurate positioning of the two eccentrics may be accomplished.

In this modification the two rollers 101 and 102 are rigid in their respective arms 103 with the exception of the above eccentric adjustment allowed for the roller 102. Ink fountain roller 1 rotatably mounted in the ink fountain 2 is made vertically adjustable by vertically adjusting the whole ink fountain by means of the introduction of shims 117 beneath the mounting of the ink fountain upon the press, the fountain being held tight by means of bolts 118 after obtaining the desired height.

Figures 13, 14, 16, 18:
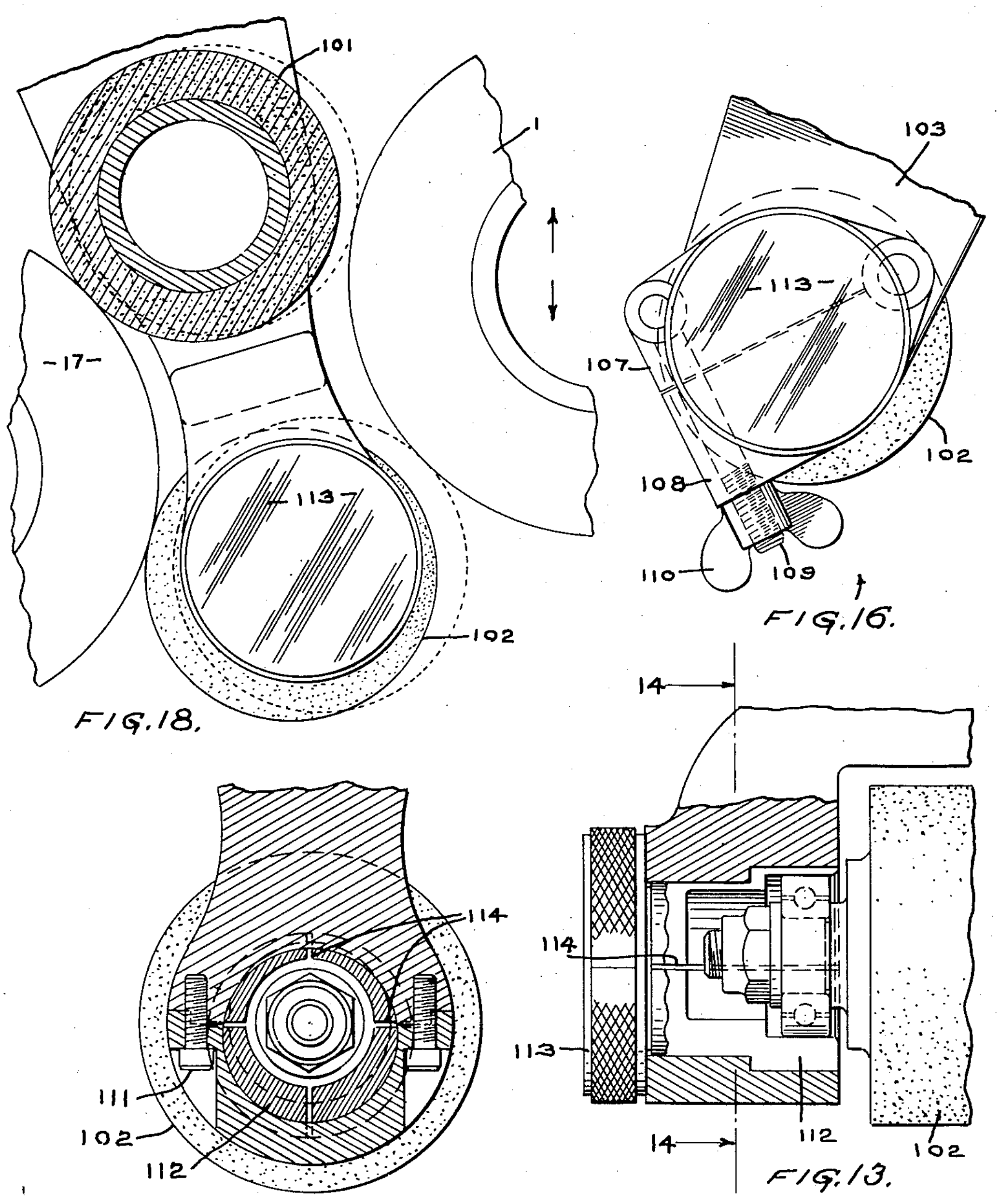
Figure 13 is a fragmentary sectional view longitudinally of the roller bearing housing.
Figure 14 is a sectional view on line 14—14 of Figure 13.
Figure 16 is an end view of the roller showing the means for releasing the bearing.
Figure 18 is a transverse sectional view of the ductor rollers and their adjacent rollers showing their adjustment and contacting positions, on line 18—18 of Figure 12.

As shown in Figure 18 the upper fixed roller 101 may be placed in accurate contact with the fixed ink feed roller or vibrator roller 17 and then the lower ductor roller 102, by rotating the eccentrics may be brought to accurate contact with the surface of the ink feed roller 17 and thereafter the height of the fountain roller 1 may be accurately adjusted up or down to bring it squarely against the surfaces of the two ductor rollers when they are swung over to the dotted line position of Figure 18.

It will be apparent from the preferred embodiment and the two modifications shown that many other modifications could be made in the invention without departing from the principle thereof and the invention as defined in the following claims.

What is claimed as new and is desired to be secured by Letters Patent is:

1. A rotary printing press inking mechanism including in combination a single fountain roller, a plurality of parallel ductor rollers spaced circumferentially around the fountain roller and each extending over a portion only of the length of the fountain roller and added together providing longitudinally continuous surface contact for the fountain roller, arms on which said ductor rollers are mounted to give an equal dwell to all the ductor rollers on the fountain roller, a common rigid shaft supporting said arms, the arms extending substantially parallel to each other from one side of the shaft, a lever for oscillating the ductor rollers substantially simultaneously to and then from the fountain roller, the common shaft rigidly supporting the several separate ductor rollers to maintain them parallel to the fountain roller.

2. A rotary printing press inking mechanism including in combination a fountain roller, a plurality of ductor rollers, spaced circumferentially around the fountain roller and each extending over a portion only of the length of the fountain roller and added together providing longitudinally continuous surface contact for the fountain roller, arms on which said ductor rollers are mounted, a common rigid shaft supporting said arms, the arms extending substantially parallel to each other from one side of the shaft, a lever for oscillating the ductor rollers substantially simultaneously to and then from the fountain roller and means to substantially equalize the dwell of the separate ductor rollers at the fountain roller, the common shaft rigidly supporting the several separate ductor rollers to maintain them parallel to the fountain roller.

3. A rotary printing press inking mechanism including in combination a driven fountain roller, a plurality of parallel ductor rollers spaced circumferentially around the fountain roller and each extending over a portion only of the length of the fountain roller and added together providing longitudinally continuous surface contact for the fountain roller, arms on which said ductor rollers are mounted, a common rigid shaft supporting said arms, the arms extending substantially parallel to each other from one side of the shaft, a bell crank lever mounted on the press, the said arms forming one lever arm of the bell crank lever and means to actuate the other lever arm of the bell crank lever to substantially simultaneously engage the fountain roller by all the ductor rollers at intervals, the common shaft rigidly supporting the several separate ductor rollers to maintain them parallel to the fountain roller.

4. A rotary printing press inking mechanism including in combination a driven fountain roller, a plurality of ductor rollers spaced circumferentially around the fountain roller and each extending over a portion only of the length of the fountain roller and added together providing longitudinally continuous surface contact for the fountain roller, arms on which said ductor rollers are mounted, a common rigid shaft supporting said arms, the arms extending substantially parallel to each other from one side of the shaft, a bell crank lever mounted on the press, the said arms forming one lever arm of the bell crank lever and means to actuate the other lever arm of the bell crank lever to substantially simultaneously engage the fountain roller by all the ductor rollers at intervals, and means to substantially equalize the dwell of the separate ductor rollers at the mountain roller, the common shaft rigidly supporting the several separate ductor rollers to maintain them parallel to the fountain roller.

5. A rotary printing press inking mechanism including in combination a driven fountain roller and a driven ink feed roller, a plurality of ductor rollers spaced circumferentially around the mountain roller and each extending over a portion only of the length of the ink feed roller and added together providing longitudinally continuous surface contact with the ink feed roller, arms on which said ductor rollers are mounted, a common rigid shaft supporting said arms, the arms extending substantially parallel to each other from one side of the shaft, a bell crank lever mounted on the press, the said arms forming one lever arm of the bell crank lever, and means to actuate the other lever arm of the bell crank lever to oscillate the ductor rollers to engage substantially simultaneously the inking roller and then the feed roller at intervals, the common shaft rigidly supporting the several separate ductor rollers to maintain them parallel to the fountain roller.

6. A rotary printing press inking mechanism including in combination a driven fountain roller and a driven ink feed roller, a plurality of ductor rollers spaced circumferentially around the fountain roller and each extending over a portion only of the length of the fountain roller and added together providing longitudinally continuous surface contact with the ink feed roller, arms on which said ductor rollers are mounted, a common rigid shaft supporting said arms, the arms extending substantially parallel to each other from one side of the shaft, a bell crank lever mounted on the press, the said arms forming one lever arm of the bell crank lever, and means to actuate the other lever arm of the bell crank lever to oscillate the ductor rollers to engage substantially simultaneously the inking roller and then the feed roller at intervals, and means to substantially equalize the dwell of the separate ductor rollers at the fountain roller, the common shaft rigidly supporting the several separate ductor rollers to maintain them parallel to the fountain roller.

7. In an inking mechanism for printing presses, a driven ink fountain roller, a pair of ductor rollers spaced circumferentially around the fountain roller and each being approximately half the length of the fountain roller and together providing longitudinally continuous surface contact for the mountain roller, brackets supporting said ductor rollers, a common rigid shaft supporting said brackets, the brackets extending substantially parallel to each other from one side of the shaft, means to separately periodically oscillate said brackets to move said ductor rollers substantially simultaneously to and then from the fountain roller, the common shaft rigidly supporting the two separate ductor rollers to maintain them parallel to the fountain roller.

8. In an inking mechanism for printing presses, a driven ink fountain roller, a pair of ductor rollers spaced circumferentially around the fountain roller and each being approximately half the length of the fountain roller, and together providing longitudinally continuous surface contact for the fountain roller, brackets supporting said ductor rollers, a common rigid shaft supporting said brackets, the brackets extending substantially parallel to each other from one side of the shaft, means to separately periodically oscillate said brackets to move said ductor rollers substantially simultaneously to and then from the fountain roller, and means to substantially equalize the dwell of the ductor rollers at the fountain roller, the common shaft rigidly supporting the two separate ductor rollers to maintain them parallel to the fountain roller.

9. In an inking mechanism for printing presses, a driven ink fountain roller, a pair of ductor rollers spaced circumferentially around the fountain roller and each being approximately half the length of the fountain roller, brackets supporting said ductor rollers, a common rigid shaft supporting said brackets, the brackets extending substantially parallel to each other from one side of the shaft, an ink feed roller driven at a substantially faster surface speed than that of the fountain roller, the ductor rollers together providing longitudinally continuous surface contact for the ink feed roller, means to periodically oscillate said brackets to bodily move said ductor rollers to and fro, to engage substantially simultaneously the fountain roller and then the feed roller, the common shaft rigidly supporting the two separate ductor rollers to maintain them parallel to the fountain roller.

10. In an inking mechanism for printing presses, a driven ink fountain roller, a pair of ductor rollers spaced circumferentially around the fountain roller and each being approximately half the length of the fountain roller, brackets supporting said ductor rollers, a common rigid shaft supporting said brackets, the brackets extending substantially parallel to each other from one side of the shaft, an ink feed roller driven at a substantially faster surface speed than that of the fountain roller, the ductor rollers together providing longitudinally continuous surface contact for the ink feed roller, means to periodically oscillate said brackets to bodily move said ductor rollers to and fro, to engage substantially simultaneously the fountain roller and then the feed roller, and means to substantially equalize the dwell of the separate ductor rollers at the fountain roller, the common shaft rigidly supporting the two separate ductor rollers to maintain them parallel to the fountain roller.

11. A rotary printing press inking mechanism including in combination a driven fountain roller, a plurality of ductor rollers spaced circumferentially around the fountain roller and each extending over a portion only of the length of the fountain roller and added together providing longitudinally continuous surface contact for the fountain roller, arms on which the respective ductor rollers are mounted with parallel axes, a common rigid shaft supporting said arms, the arms extending substantially parallel to each other from one side of the shaft, levers for independently oscillating the separate ductor rollers substantially simultaneously to and then from the fountain roller, the common shaft rigidly supporting the several separate ductor rollers to maintain them parallel to the fountain roller.

12. A rotary printing press inking mechanism including in combination a driven fountain roller, a plurality of ductor rollers each extending over a portion only of the length of the fountain roller and added together providing longitudinally continuous surface contact for the fountain roller, arms on which the respective ductor rollers are mounted with parallel axes, a common rigid shaft supporting said arms, the arms extending substantially parallel to each other from one side of the shaft, levers for independently oscillating the separate ductor rollers substantially simultaneously to and then from the fountain roller, and means to substantially equalize the dwell of the separate ductor rollers at the fountain roller, the common shaft rigidly supporting the several separate ductor rollers to maintain them parallel to the fountain roller.

13. A rotary printing press inking mechanism including in combination a driven fountain roller and a driven ink feed roller, a plurality of ductor rollers each extending over a portion only of the length of the fountain roller and added together providing longitudinally continuous surface contact for the fountain roller, arms on which the respective ductor rollers are mounted with parallel axes, a common rigid shaft supporting said arms, the arms extending substantially parallel to each other from one side of the shaft, a plurality of bell crank levers mounted in the press, one for each ductor roller, the supporting arms for each ductor roller forming one arm of each bell crank lever, and means to actuate the other arm of each bell crank lever to substantially simultaneously engage the fountain roller by all the ductor rollers at intervals, the common shaft rigidly supporting the several separate ductor rollers to maintain them parallel to the fountain roller.

14. A rotary printing press inking mechanism including in combination a driven fountain roller and a driven ink feed roller, a plurality of ductor rollers spaced circumferentially around the fountain roller and each extending over a portion only of the length of the fountain roller and added together providing longitudinally continuous surface contact for the fountain roller, arms on which the respective ductor rollers are mounted with parallel axes, a plurality of bell crank levers mounted in the press, one for each ductor roller, the supporting arms for each ductor roller forming one arm of each bell crank lever, and means to actuate the other arm of each bell crank lever to substantially simultaneously engage the fountain roller by all the ductor rollers at intervals, means for variably angularly positioning one of said levers relatively to its ductor roller arms without disturbing the position of another of said levers relatively to its ductor roller arms.

15. A rotary printing press inking mechanism including in combination a driven fountain roller, a plurality of ductor rollers spaced circumferentially around the fountain roller and each extending over a portion only of the length of the fountain roller and added together providing longitudinally continuous surface contact for the fountain roller, means to mount said ductor rollers together as a unit, with ductor roller axes parallel, arms pivoted at one end in the press and at the other end being attached to the unit mounting means of the ductor rollers, levers connected to said arms for oscillating the ductor rollers unit bodily to and from the fountain roller.

16. A rotary printing press inking mechanism including in combination a driven fountain roller, a plurality of ductor rollers spaced circumferentially around the fountain roller and each extending over a portion only of the length of the fountain roller and added together providing longitudinally continuous surface contact for the fountain roller, means to mount said ductor rollers together as a unit, with ductor roller axes parallel, arms pivoted at one end in the press and at the other end being attached to the unit mounting means of the ductor rollers, levers connected to said arms for oscillating the ductor rollers unit bodily to and from the fountain roller and means to substantially equalize the dwell of the separate ductor rollers at the fountain roller.

17. A rotary printing press inking mechanism including in combination a driven fountain roller, a plurality of ductor rollers spaced circumferentially around the fountain roller and each extending over a portion only of the length of the fountain roller and added together providing longitudinally continuous surface contact for the fountain roller, means to mount said ductor rollers together as a unit, with the ductor roller axes parallel, arms pivoted at one end in the press and at the other end between certain of the ductor roller axes of the unit mounting means of the ductor rollers, levers connected to said arms for oscillating the ductor rollers unit bodily to and from the fountain roller.

18. A rotary printing press inking mechanism including in combination a driven fountain roller, a plurality of ductor rollers each extending over a portion only of the length of the fountain roller and added together providing longitudinally continuous surface contact for the fountain roller, means to mount said ductor rollers together as a unit, with the ductor roller axes parallel, arms pivoted at one end in the press and at the other end being attached to the unit mounting means of the ductor rollers, resilient means extending between the arms and ductor rollers, unit mounting means to allow relative swinging of the respective ductor rollers to substantially equalize the dwell of the ductor rollers at the fountain roller, levers connected to said arms for oscillating the ductor rollers unit bodily to and from the fountain roller.

19. A rotary printing press inking mechanism including in combination a driven fountain roller, a plurality of ductor rollers spaced circumferentially around the fountain roller and each extending over a portion only of the length of the fountain roller and added together providing longitudinally continuous surface contact for the fountain roller, means to mount said ductor rollers, together as a unit, with ductor roller axes parallel, arms pivoted at one end in the press and at the other end being attached to the unit mounting means of the ductor rollers, levers connected to said arms for oscillating the ductor rollers unit bodily to and from the fountain roller and means for changing the position of one of said ductor rollers without disturbing the position of another of said ductor rollers relative to the ductor roller arms.

References Cited in the file of this patent

UNITED STATES PATENTS

| Number | Name | Date |
|---|---|---|
| 625,318 | Bradford | May 23, 1899 |
| 664,578 | Pancoast | Dec. 25, 1900 |
| 1,262,709 | Smith | Apr. 16, 1918 |
| 1,437,695 | Veil | Dec. 5, 1922 |
| 1,977,375 | Chandler | Oct. 16, 1934 |
| 1,982,830 | Richter | Dec. 4, 1934 |
| 1,996,607 | Barber | Apr. 2, 1935 |
| 2,083,542 | Barber | June 15, 1937 |
| 2,526,254 | Meyer | Oct. 17, 1950 |

FOREIGN PATENTS

| Number | Country | Date |
|---|---|---|
| 601,883 | Great Britain | May 13, 1948 |